Figure 1:
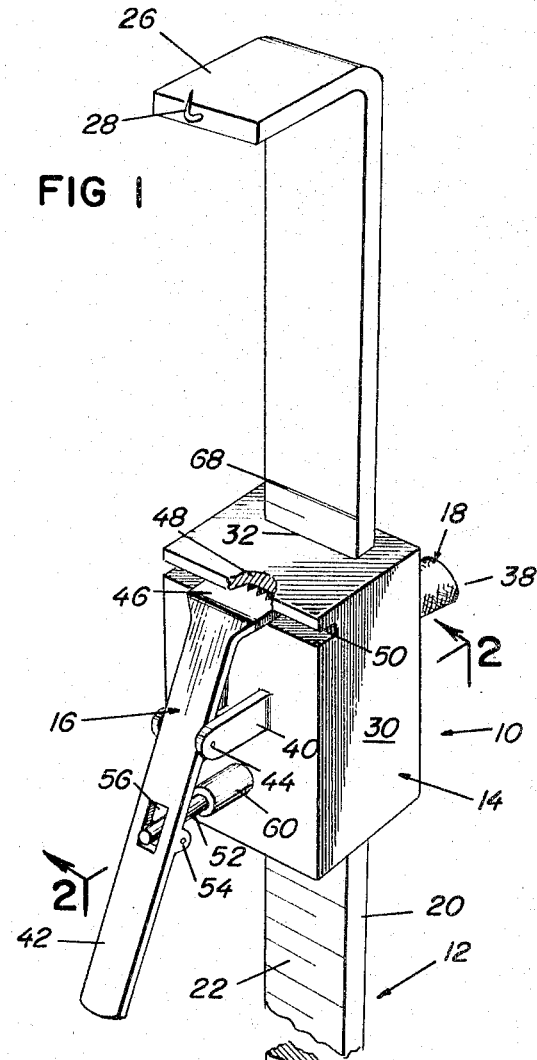

May 9, 1967  M. J. WOODFIN  3,318,141
STOCKING STRETCHING TEST DEVICE
Filed April 24, 1964

Merrill J. Woodfin
INVENTOR

BY Jacobi & Davidson
ATTORNEYS

United States Patent Office 3,318,141
Patented May 9, 1967

3,318,141
STOCKING STRETCHING TEST DEVICE
Merrill J. Woodfin, Morristown, Tenn., assignor to Sport-Wear Hosiery Mills, Inc., Etowah, Tenn., a corporation of Tennessee
Filed Apr. 24, 1964, Ser. No. 362,327
4 Claims. (Cl. 73—95)

This invention relates to a device or mechanism for stretching fabrics and more particularly it relates to a device for stretching stockings to determine their elasticity.

As is well known, stockings are formed in a tubular configuration having a foot portion closed at the toe end and a leg portion open at its upper end or cuff. Such stockings are generally produced by being knit upon a circular knitting machine and within such a machine, an adjustable tensioning device is usually provided to permit the stockings to be knit with each thread therein being subjected to the proper tension. Naturally, if such a tensioning device is maintained in proper adjustment, each knitted stocking will be of a similar and proper size and will therefore be commercially acceptable. However, it is necessary to almost constantly maintain a check on such a tensioning device since changing of the size or style of stocking to be knitted, changing of the thread supply rolls with thread from a different lot, and occasional inaccurate settings by the machine operator all tend to vary the tension applied to the knitted thread and hence tend to vary the elasticity of the produced stocking.

It can be seen, therefore, that some suitable form of test method and apparatus is necessary for periodically testing such knitted stockings to determine their elasticity and to assure that it remains within the predetermined prescribed limits for commercial acceptability. Certain stock stretch test machines have heretofore been developed but these machines have not proved entirely satisfactory or acceptable for several reasons. First of all, such machines were often large and complicated pieces of equipment which were expensive to purchase and maintain and which took up an inordinate amount of floor space. Further, due to the many settings and adjustments which were necessary on such machines, it was necessary to specially train an operator to run the machine, and even with such a trained operator, a great deal of time was consumed in running even a simple test. Finally, in such machines the indicating or measuring scale which gave the elasticity readings was often a complicated graph or circular scale which required unit conversion and interpolation to give an indication of stretch or deformation.

It is, therefore, a primary object of the present invention to overcome the difficulties and deficiencies encountered in the prior art and to provide an improved stocking stretching device.

Another primary object of the present invention is to provide a device for subjecting stockings and other fabric articles to a quick and uniform stretching action and for indicating the amount of such stretch to thereby test and determine the elasticity thereof.

Other general, though equally significant, objects of the present invention include the provision of a stocking stretching device which: (a) is simple and uncomplicated in its manufacture, (b) is easily operated by a person having no special skills or training, (c) requires a minimum amount of floor space, (d) is inexpensive to produce, service and maintain, and (e) can be quickly and efficiently operated to produce the desired stretching effect and to give a clear and accurate indicate thereof.

Other objects, advantages and salient feaures of the present invention will become apparent from the following detailed description, which, taken in connection with the annexed drawings, discloses a preferred embodiment thereof.

Figures 3, 4:
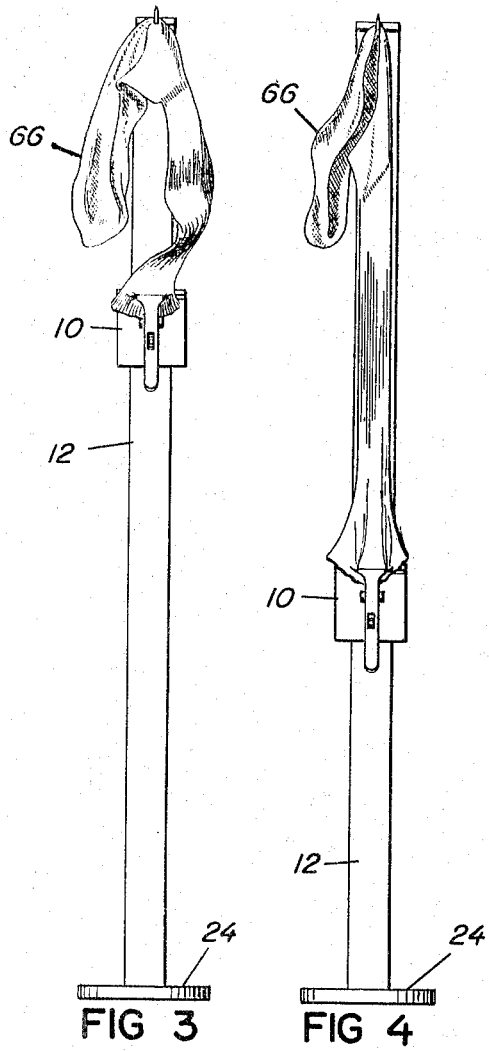
Figure 2:
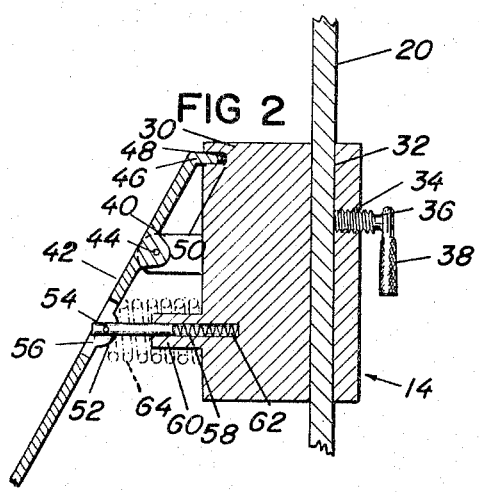

Referring to the drawings:
FIGURE 1 is a perspective view of a stocking stretch test device in accordance with the principles of the present invention;
FIGURE 2 is a fragmentary longitudinal sectional view of the device taken substantially along line 2—2 of FIGURE 1;
FIGURE 3 is a front elevational view of the device having a stocking mounted thereon prior to stretching; and
FIGURE 4 is a front elevational view of the device with the stocking mounted thereon being stretched to test its elasticity.

In accordance with the principles of the present invention and as can be seen generally from FIGURE 1 thereof, there is provided a stocking stretching device generally designated 10 which includes a support means generally designated 12, a carriage mechanism generally designated 14 slidable along the support means, and a clamp means generally designated 16 and a locking means generally designated 18, both provided upon the carriage mechanism.

The support means 12 is an elongated rod or post 20 having a series of spaced calibrations 22 along a least one surface thereof. One end of the rod 20 may be suitably mounted in a base support 24 which supports the rod and allows it to extend upright in a substantially vertical position. While it is not essential that the rod 20 be absolutely vertical, it should not be inclined more than an acute angle from a true vertical position since the vertical positioning of the rod 20 assures that the carriage mechanism 14 will move freely under gravitational force. One suitable alternative arrangement of the present device is to eliminate the base support 24 and to rest the lower end of the rod 20 on the floor and the upper end of the rod against a wall. In this manner, the rod 20 will still be substantially vertical and the device will therefore function satisfactorily.

The upper end of the rod 20 is provided with a stocking gripping means in which a stocking or other fabric article can be easily and efficiently grasped. To this end, the rod is bent forwardly at 26 to provide a substantially right angular portion at its end, and disposed on this portion is a hooked needle 28 with its point extending upwardly as shown in FIGURE 1.

The carriage mechanism 14 has its main portion formed of a weighted body 30 fabricated of a heavy material such as steel or lead which will fall freely under the influence of gravity. A slot 32 extends longitudinally through the body 30 and is shaped and sized in such a manner that it can suitably accommodate the rod 20. The locking means 18 provides a means for selectively locking the carriage mechanism 14 at any position along the rod 20. Included in the locking means 18 is a threaded hole 34 which communicates with the longitudinal rod slot 32, and a compatibly threaded stem 36 rotatably mounted within the hole 34. A handle 38 is appended to the outer end of the stem 36 and manual rotation of the handle causes the stem to move either inwardly into engagement with the slot-contained rod 20 to frictionally lock the carriage mechanism 14 or outwardly and out of engagement with the rod 20 to thus allow free movement of the carriage mechanism 14.

The locking means 18 is provided on that surface of the carriage mechanism 14 nominally identified as its rear. The opposite or front surface of the carriage mechanism 14 is aligned beneath the hooked needle 28, and upon this front surface, the clamp means 16 is provided. A pair of spaced ears 40 extend outwardly from the front surface and between these ears, a lever 42 is pivotally mounted by means of a pivot pin 44 which extends through the ends of the ears and the body of the lever. At the upper end of the lever 42, a jaw 46 having a serrated or toothed edge 48 is mounted in such a manner that the edge 48 can fit within a groove or slot 50 in the body 30 of the carriage mechanism.

Beneath the ears 40 which pivotally mount the lever 42, a spring-biasing means is provided for normally forcing the serrated jaw edge 48 toward and into its associated groove 50. As part of this spring-biasing means, a pin 52 is pivotally mounted to the lever 42 by a pivot pin 54. A window or aperture 56 is provided in the lever 42 to allow the pin 52 to pivot freely without its end striking or abutting the lever itself. The free or unmounted end of the pin 52 projects into a bore 58 which extends through a boss 60 and into the body 30. The boss 60 projects from the front surface of the carriage mechanism 14 and serves to provide a stop or abutment for limiting pivotal movement of the lever 42. Within the bore 58, a compression spring 62 is disposed between the end of the pin 52 and the end of the bore. This compression spring serves to bias the pin 52 outwardly and thus serves to pivot the lever 42 so the serrated jaw edge 48 is disposed within the groove 50. If the strength of the spring 62 is not sufficient to produce a strong enough bias to properly pivot the lever 42, a larger auxiliary spring 64, as shown in dashed lines in FIGURE 2, may be provided about the outside of the pin 52 and boss 60 and extending between the front of the body 30 and the rear of the lever 42.

To operate the device 10, a stocking or other similar article 66 is attached to the support means 12 by the gripping means. As shown in FIGURES 3 and 4, a stocking 66 is hung over the hooked needle 28 which passes through the last stitch in the gore of the heel. In this manner, both the leg and the foot of the stocking hang freely down along the front of the rod 20. At the bottom end of the hanging foot is the toe portion and at the bottom end of the hanging leg is the cuff portion. Either the toe portion or the cuff portion is engaged in the clamp means 16 prior to stretching.

Prior to such clamping, the carriage mechanism 14 is moved to a preselected location along the rod 20 and is locked at this location by operation of the locking means 18. This preselected location can be either with one edge of the carriage mechanism in alignment with the initial calibration, identified in FIGURE 1 as 68, or it can be at some other suitable location along the rod. The only essential criterion for the location of the carriage mechanism is that the clamp means 16 be spaced close enough to the stocking 66 so that its toe or cuff portion can be clamped while the foot or leg remains in a loose and unstretched position.

In FIGURE 3, it is the cuff portion of the stocking 66 which is engaged in the clamp means 16 of the carriage mechanism 14, which has previously been locked in its preselected position. To accomplish such a clamp engagement, the lower end of the lever 42 is manually pushed toward the body 30 of the carriage mechanism. Such manual pushing overcomes the bias of the spring 62, and the spring 64 if present, and thus allows the lever to pivot and move the jaw 46 away from the body 30, thereby removing the serrated edge 48 from the groove 50. The cuff portion of the stocking is then inserted between the jaw 46 and the body 30 and when the lower end of the lever 42 is released, the spring 62, and also spring 64 if present, bias the jaw toward the body thus clamping that cuff portion of the stocking between the serrated edge 48 and the groove 50.

The locking means 18 is then released and gravitational force causes the weighted body 30 and the associated carriage mechanism parts to slide down the rod 20 from the initial position of FIGURE 3 to the final position of FIGURE 4. When the carriage mechanism 14 reaches the final position shown in FIGURE 4, the leg portion of the stocking is fully stretched or extended. A reading of the calibrations 22 gives the total movement of the carriage mechanism and also gives the location of the end of the fully stretched leg portion of the stocking. Subsequently, when other stockings of the same style are stretch tested by the device, a reading of their final positions can be compared to the earlier final position reading and in this manner, comparative elasticity of the stockings can be determined. If in testing a future stocking, the carriage mechanism 14 descends lower than it did with the stocking shown in FIGURE 4, it will be understood that the future stocking has a greater elasticity than that of stocking 66 of FIGURE 4. If this is undesirable, the knitting machine tensioning apparatus can be properly adjusted to make the stocking less elastic.

If it is assumed that the stocking 66 of FIGURES 3 and 4 is to be a standard stocking having the proper elasticity in its leg and foot portions, any deviation from the final carriage position of FIGURE 4 can be read directly from the calibrations 22. If desired, these calibration deviations can be converted into a nomogram which indicates the proper knitting machine adjustment to make to restore the elasticity to its standard. It should also be appreciated that, due to the novel mounting arrangement in the present device, both the foot and leg elasticity can be tested without removing or repositioning the stocking 66. As soon as the leg testing of FIGURES 3 and 4 is completed, the carriage mechanism 14 is returned to its FIGURE 3 position, the clamp means 16 is opened, the stocking leg portion is removed, and the stocking foot portion is clamped and tested in the previously described manner.

It is believed that the foregoing detailed description clearly establishes that the objects set forth at the outset of this specification have been successfully achieved. Accordingly,

What is claimed is:

1. a device for determining and indicating the stretch or elasticity of fabric stockings having a heel portion intermediate a foot portion and a leg portion terminating respectively in a toe end and a cuff end, said device comprising:

an elongated support means having upper and lower ends;

base means;

said support means being coupled at its lower end with said base means;

said support means including an angularly offset portion at its upper end;

said support means, between said base means and said angularly offset portion, extending in substantially vertical disposition and having a non-circular cross-sectional configuration, a hooked needle fixed to said angularly offset portion to enable a stocking to be mounted by its heel portion;

carriage means including a weighted body having a non-circular bore extending therethrough at least substantially corresponding to the cross-sectional configuration of said support means;

said support means extending through said carriage means bore to enable said carriage means to slide along said support means between said base means and said angularly offset portion;

locking means for fixedly securing said carriage means to said support means in a selected spaced relation to said angularly offset portion generally corresponding in length to the length of either the foot portion or the leg portion of the stocking;

clamp means mounted upon said carriage means in generally vertical alignment with said hooked needle for releasably engaging the toe end or the cuff end of the stocking;

said locking means being releasable to permit said carriage means to slide downwardly on said support means under the influence of gravity acting on said weighted body after the selected end of the stocking has been engaged by said clamping means;

and indicia means on said support means to indicate the amount of stretch or elasticity in the portion of the stocking being tested by the final position of said carriage means on said support means.

2. A device as defined in claim 1 wherein said locking means includes a stem which extends through a portion of said carriage means and which is manually rotatable for frictional engagement with said support means.

3. A device as defined in claim 1 wherein said clamping means includes a lever pivotally mounted on said carriage means and having a serrated jaw at one end thereof to engage the selected end of the stocking between said jaw and said carriage means.

4. A device as defined in claim 3 wherein said clamping means includes at least one spring which normally biases said jaw toward said carriage means but wherein the bias of said spring can be overcome by manual pivotal movement of said lever.

References Cited by the Examiner

UNITED STATES PATENTS

| | | | |
|---|---|---|---|
| 1,558,594 | 10/1925 | Coffin | 73—95 X |
| 1,917,597 | 7/1933 | Nessler | 73—95 X |
| 2,286,651 | 6/1942 | Scott | 73—95 |
| 2,470,316 | 5/1949 | Miller. | |
| 2,782,635 | 2/1957 | Knight | 73—95 |
| 3,099,152 | 7/1963 | Krueger | 73—95 |

RICHARD C. QUEISSER, *Primary Examiner.*

J. W. MYRACLE, *Assistant Examiner.*